United States Patent Office 2,758,046
Patented Aug. 7, 1956

2,758,046

THIAZOLECARBOXAMIDES FOR BONDING FIBER TO RUBBER

Rutherford B. Hill, St. Albans, and Harry W. Kilbourne, South Charleston, W. Va., assignors to Monsanto Chemical Company, St. Louis, Mo., a corporation of Delaware No Drawing. Application July 19, 1954, Serial No. 444,346

9 Claims. (Cl. 154—52)

This invention relates to a new class of amides and their use as adhesives for bonding fibers such as rayon or nylon tire cord to natural and synthetic rubbers. More particularly the invention relates to thiazolecarboxamides. The new compounds possess the structural formula

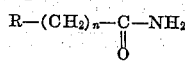

where R represents a 2-mercaptothiazolyl radical and $n$ is an integer from 0 to 4. Suitable examples of 2-mercaptothiazolyl radicals are 2-mercapto-4-methyl-5-thiazolyl, 2 - mercapto - 4 - ethyl - 5 - thiazolyl, 2 - mercapto-4-butyl-5-thiazolyl and 2-mercapto-4-thiazolyl radicals.

One object of the invention is to produce thiazolecarboxamides which are useful for bonding fibers to rubber. Another object of the invention is to provide a method for making the thiazolecarboxamides. Still another object is to provide a method for treating the fibers to increase the adhesion to the rubber. A still further object is to provide vulcanized fiber reinforced rubber articles of superior properties. These and other objects will more clearly appear hereinafter.

The following is illustrative of the invention.

To a solution of 175 grams (1.0 mole) of 2-mercapto-4-methyl-5-thiazolecarboxylic acid (Beil., 4th edition, vol. 27, p. 339) in 300 ml. of benzene there was added slowly over a period of 15 minutes with vigorous stirring 140 grams of thionyl chloride and the mixture stirred and heated to reflux for six hours. The solvent and excess thionyl chloride were then removed under reduced pressure and 400 ml. of dry benzene added to the residue. Intermittent cooling with an ice bath was used to keep the temperature of the reaction mixture below 60° C. while passing gaseous ammonia into the solution. When no further reaction occurred with addition of ammonia, the solid was filtered and air-dried. The dried product was then dissolved in a 10% solution of sodium hydroxide, filtered, the filtrate acidified wtih concentrated hydrochloric acid to a pH of 1, again filtered, washed with water and dried at 50° C. After recrystallization from ethyl alcohol the 2-mercapto-4-methyl-5-thiazolecarboxamide so obtained had a melting point of 263–264° C.

Rayon tire cord (1100/490/2) suitable for use in the manufacture of automobile tires was treated with a 10% solution of 2-mercapto-4-methyl-5-thiazolecarboxamide in water. The cord was led into the solution by passing it under an aluminum reel dipping in a body of the solution contained in an aluminum container. After the cord was pulled through the treating bath it was air dried. After leaving the bath the cord may be squeegeed but it was found in practice that this step is not essential. Furthermore, drying at elevated temperature, as for example under a bank of infrared lamps, is feasible if desired.

A butadiene-styrene copolymer rubber matrix was compounded comprising

| | Parts by weight |
|---|---|
| GR–S 1500 | 100.0 |
| Zinc oxide | 5.0 |
| Sulfur | 3.0 |
| 2,2'-dithiobis benzothiazole | 1.5 |
| Saturated hydrocarbon softener | 7.5 |
| Carbon black | 25.0 |

This composition was sheeted from a rubber mill at 0.052" and rolled onto square woven cotton duck backing cloth of a thickness 0.014" to 0.015" to give a total gauge of approximately 0.065". The treated cord was then placed between strips of the rubber coated fabric backing cloth and the assembly placed in a modified Armstrong mold. The plates were 11½" x 12⅝" and the rubber strip channels ⅜" wide by 0.100" deep and separated by ¼". 16 cord slots were separated from one another by 1" on their centers. Further details of the Armstrong mold are described in India Rubber World, May 1946, pages 213–219. The contents in the mold were cured by heating for 30 minutes at 142° C. From the cured slabs H shaped specimens were cut and the adhesion of the cord to rubber determined. Essentially the H test is a measurement of the force required to pull a single cord in the direction of its axis from a strip of rubber in which one length of the cord of a given length is embedded. Thus, the quantity measured is the pounds shearing force acting across the cord to rubber interface. Set forth below are the averages of several determinations:

Table

| Adhesion—Pounds | | Percent Increase |
|---|---|---|
| Untreated | Treated | |
| 8.0 | 14.3 | 79 |

It is intended to cover all changes and modifications of the examples of the invention herein chosen for purposes of disclosure which do not constitute departures from the spirit and scope of the invention.

What is claimed is:

1. Thiazolecarboxamides of the structural formula

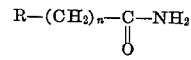

where R represents a radical containing the meta-thiazole ring having a mercapto group in the 2-position attached to the amide radical at one of the vicinal carbon atoms, the valence on the other vicinal carbon atom being satisfied by a member of the group consisting of hydrogen and alkyl radicals of less than five carbon atoms and $n$ is an integer from 0 to 4.

2. 2-mercapto-4-methyl-5-thiazolecarboxamide.

3. Vulcanized fiber reinforced rubber articles, said fiber being adhered to the vulcanized rubber by means of thiazolecarboxamides of the structural formula

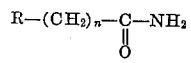

where R represents a radical containing the meta-thiazole ring having a mercapto group in the 2-position attached to the amide radical at one of the vicinal carbon atoms, the valence on the other vicinal carbon atom being satisfied by a member of the group consisting of hydrogen and alkyl radicals of less than five carbon atoms and n is an integer from 0 to 4.

4. Vulcanized fiber reinforced rubber articles, said fiber being adhered to the vulcanized rubber by means of 2-mercapto-4-methyl-5-thiazolecarboxamide.

5. A vulcanized rubber-rayon cord composite article, said rayon cord being adhered to the vulcanized rubber of the said composite article by means of thiazolecarboxamides of the structural formula

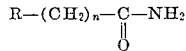

where R represents a radical containing the meta-thiazole ring having a mercapto group in the 2-position attached to the amide radical at one of the vicinal carbon atoms, the valence on the other vicinal carbon atom being satisfied by a member of the group consisting of hydrogen and alkyl radicals of less than five carbon atoms and n is an integer from 0 to 4.

6. A vulcanized rubber-rayon cord composite article, said rayon cord being adhered to the vulcanized rubber of the said composite article by means of 2-mercapto-4-methyl-5-thiazolecarboxamide.

7. Thiazolecarboxamides of the structural formula

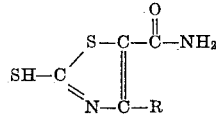

where R is an alkyl radical of less than five carbon atoms.

8. Vulcanized fiber reinforced rubber articles, said fiber being adhered to the vulcanized rubber by means of a thiazolecarboxamide of the structure

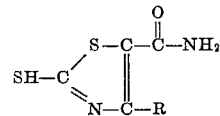

where R is an alkyl radical of less than five carbon atoms.

9. A vulcanized rubber-rayon cord composite article, said rayon cord being adhered to the vulcanized rubber of the said composite article by means of a thiazolecarboxamide of the structure

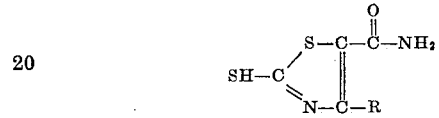

where R is an alkyl radical of less than five carbon atoms.

References Cited in the file of this patent
UNITED STATES PATENTS
2,402,066    Mathes _____ June 11, 1946